(12) United States Patent
Biase

(10) Patent No.: US 8,781,952 B1
(45) Date of Patent: Jul. 15, 2014

(54) SYSTEMS, METHODS AND COMPUTER SOFTWARE RELATED TO POOLED CREDIT RISK AND FINANCIAL INSTRUMENT ALLOCATION

(76) Inventor: Lucio Biase, Jersey City, NJ (US)

( * ) Notice: Subject to any disclaimer, the term of this patent is extended or adjusted under 35 U.S.C. 154(b) by 1140 days.

(21) Appl. No.: 12/244,417

(22) Filed: Oct. 2, 2008

Related U.S. Application Data

(60) Provisional application No. 60/976,865, filed on Oct. 2, 2007.

(51) Int. Cl.
*G06Q 40/00* (2012.01)
(52) U.S. Cl.
USPC .............................................. 705/38
(58) Field of Classification Search
CPC ................ G06Q 40/04; G06Q 40/06
USPC ...................................... 705/35–45
See application file for complete search history.

(56) References Cited

U.S. PATENT DOCUMENTS

| | | | |
|---|---|---|---|
| 5,802,499 A * | 9/1998 | Sampson et al. ................ 705/35 |
| 6,260,025 B1 * | 7/2001 | Silverman et al. .............. 705/37 |
| 6,304,858 B1 | 10/2001 | Mosler et al. | |
| 6,317,727 B1 * | 11/2001 | May ............................. 705/36 R |
| 6,421,653 B1 * | 7/2002 | May ............................. 705/36 R |
| 7,333,950 B2 | 2/2008 | Shidler et al. | |
| 7,530,490 B1 * | 5/2009 | Finkemeier et al. ........... 235/379 |
| 7,533,054 B2 * | 5/2009 | Hausman et al. ............... 705/37 |
| 7,571,136 B2 * | 8/2009 | May ............................... 705/37 |
| 7,689,497 B2 * | 3/2010 | May ............................... 705/37 |
| 7,698,208 B2 * | 4/2010 | Hirani et al. .................... 705/37 |
| 8,015,106 B2 * | 9/2011 | Crawford et al. ............... 705/38 |
| 8,266,053 B2 * | 9/2012 | Crawford et al. ............... 705/38 |
| 2002/0055897 A1 | 5/2002 | Shidler et al. | |
| 2002/0099651 A1 * | 7/2002 | May .............................. 705/38 |
| 2002/0116317 A1 * | 8/2002 | May .............................. 705/37 |
| 2003/0093360 A1 * | 5/2003 | May .............................. 705/37 |
| 2003/0220868 A1 * | 11/2003 | May .............................. 705/37 |
| 2004/0024692 A1 * | 2/2004 | Turbeville et al. .............. 705/38 |
| 2004/0143535 A1 | 7/2004 | Hirani et al. | |
| 2005/0080734 A1 | 4/2005 | Lynch et al. | |
| 2005/0108128 A1 * | 5/2005 | Kastel et al. .................... 705/35 |
| 2005/0108145 A1 * | 5/2005 | Kastel et al. .................... 705/37 |
| 2006/0036534 A1 * | 2/2006 | Hirani et al. .................... 705/38 |
| 2006/0080214 A1 * | 4/2006 | Hausman et al. ............... 705/37 |
| 2006/0129472 A1 * | 6/2006 | Harrington ..................... 705/35 |
| 2006/0224491 A1 | 10/2006 | Pinkava | |
| 2006/0224492 A1 | 10/2006 | Pinkava | |
| 2006/0224493 A1 * | 10/2006 | Pinkava ......................... 705/37 |

(Continued)

OTHER PUBLICATIONS

Bosco,Pearl, "RXM diagnoses credit risk ills", Bank Systems & Technology, 32.9, Sep. 1995, pp. 1-4.*

(Continued)

*Primary Examiner* — Mohammad Z Shaikh
(74) *Attorney, Agent, or Firm* — Greenberg Traurig, LLP

(57) ABSTRACT

One embodiment of the present invention is directed to a system related to pooled credit risk. Another embodiment of the present invention is directed to a method related to pooled credit risk. Another embodiment of the present invention is directed to computer software related to pooled credit risk. Another embodiment of the present invention is directed to a financial instrument allocation optimization algorithm. In one example, the financial instrument allocation optimization algorithm may relate to a maximum matching algorithm. In another example, the financial instrument allocation optimization algorithm may relate to a maximum dispersion algorithm.

10 Claims, 19 Drawing Sheets

SETTLEMENT #1: FIXING

| POSITION NUMBER | ACCOUNT | NOTIONAL(CONTRACTS) | FACING |
|---|---|---|---|
| 1 | ID(i) | 3,000 | DIRECT(i) |
| 2 | ID(ii) | −5,000 | DIRECT(i) |
| 3 | DIRECT(i) | −2,000 | POOLED CREDIT |
| 4 | DIRECT(ii) | −6,000 | POOLED CREDIT |
| 5 | DIRECT(iii) | 2,000 | POOLED CREDIT |
| 6 | DIRECT(iv) | 7,000 | POOLED CREDIT |
| 7 | DIRECT(v) | −1,000 | POOLED CREDIT |
| 8 | ID(iii) | 2,000 | DIRECT(v) |

(56) References Cited

U.S. PATENT DOCUMENTS

| | | |
|---|---|---|
| 2006/0224494 A1 | 10/2006 | Pinkava |
| 2007/0250433 A1* | 10/2007 | Bhat et al. .................. 705/37 |
| 2008/0059382 A1* | 3/2008 | Burczyk .................. 705/36 R |
| 2008/0071664 A1* | 3/2008 | Silverman et al. .......... 705/37 |
| 2008/0313095 A1* | 12/2008 | Shalen .................. 705/36 R |
| 2009/0055303 A1* | 2/2009 | Callaway et al. ............ 705/37 |

OTHER PUBLICATIONS

Dean, Jerry F, "Business Credit", 109.2, (Feb. 2007), p. 58.*
Sees, Karl, "Digging deep into derivatives: trying to make life easier", Balance Sheet, 2003, 11, 3, Proqeust Central, pp. 1-11.*

* cited by examiner

SETTLEMENT: PRE-FIXING (OPEN POSITIONS)

INITIAL POSITIONS

| POSITION NUMBER | ACCOUNT | NOTIONAL(CONTRACTS) | FACING |
|---|---|---|---|
| 1 | ID(i) | 3,000 | DIRECT(i) |
| 2 | ID(ii) | −5,000 | DIRECT(i) |
| 3 | DIRECT(i) | −2,000 | POOLED CREDIT |
| 4 | DIRECT(ii) | −6,000 | POOLED CREDIT |
| 5 | DIRECT(iii) | 2,000 | POOLED CREDIT |
| 6 | DIRECT(iv) | 7,000 | POOLED CREDIT |
| 7 | DIRECT(v) | −1,000 | POOLED CREDIT |
| 8 | ID(iii) | 2,000 | DIRECT(v) |

FIG.4

SETTLEMENT #1: FIXING

| POSITION NUMBER | ACCOUNT | NOTIONAL(CONTRACTS) | FACING |
|---|---|---|---|
| 1 | ID(i) | 3,000 | DIRECT(i) |
| 2 | ID(ii) | −5,000 | DIRECT(i) |
| 3 | DIRECT(i) | −2,000 | POOLED CREDIT |
| 4 | DIRECT(ii) | −6,000 | POOLED CREDIT |
| 5 | DIRECT(iii) | 2,000 | POOLED CREDIT |
| 6 | DIRECT(iv) | 7,000 | POOLED CREDIT |
| 7 | DIRECT(v) | −1,000 | POOLED CREDIT |
| 8 | ID(iii) | 2,000 | DIRECT(v) |

FIG.6

SETTLEMENT #2:

| POSITION NUMBER | ACCOUNT | NOTIONAL(CONTRACTS) | FACING |
|---|---|---|---|
| 1 | ID(i) | 3,000 | DIRECT(i) |
| 2 | ID(ii) | −5,000 | DIRECT(i) |
| 3 | DIRECT(i) | −2,000 | DIRECT(iii) |
| 3 | DIRECT(iii) | 2,000 | DIRECT(i) |
| 4 | DIRECT(ii) | −6,000 | DIRECT(iv) |
| 4 | DIRECT(iv) | 6,000 | DIRECT(ii) |
| 5 | DIRECT(iv) | 1,000 | DIRECT(v) |
| 5 | DIRECT(v) | −1,000 | DIRECT(iv) |
| 6 | DIRECT(v) | −2,000 | ID(iii) |
| 6 | ID(iii) | 2,000 | DIRECT(v) |

FIG.8

SETTLEMENT #3:
HYBRID: POOLED CREDIT MAY STILL BE EMPLOYED BY SOME OR ALL OR NONE OF THE PARTIES

| POSITION NUMBER | ACCOUNT | NOTIONAL(CONTRACTS) | FACING |
|---|---|---|---|
| 1 | ID(i) | 3,000 | DIRECT(i) |
| 2 | ID(ii) | −5,000 | DIRECT(i) |
| 3 | DIRECT(i) | −2,000 | POOLED CREDIT |
| 3 | POOLED CREDIT | 2,000 | DIRECT(i) |
| 4 | DIRECT(iii) | 2,000 | POOLED CREDIT |
| 4 | POOLED CREDIT | −2,000 | DIRECT(iii) |
| 5 | DIRECT(ii) | −6,000 | DIRECT(iv) |
| 5 | DIRECT(iv) | 6,000 | DIRECT(ii) |
| 6 | DIRECT(iv) | 1,000 | DIRECT(v) |
| 6 | DIRECT(v) | −1,000 | DIRECT(iv) |
| 7 | DIRECT(v) | −2,000 | ID(iii) |
| 7 | ID(iii) | 2,000 | DIRECT(v) |

FIG.10

|   | A | B | C | D | E |
|---|---|---|---|---|---|
| A | X | 10 | 0 | 10 | 10 |
| B | 10 | X | 15 | 10 | 10 |
| C | 0 | 5 | X | 10 | 10 |
| D | 10 | 10 | 10 | X | 10 |
| E | 10 | 10 | 10 | 10 | X |

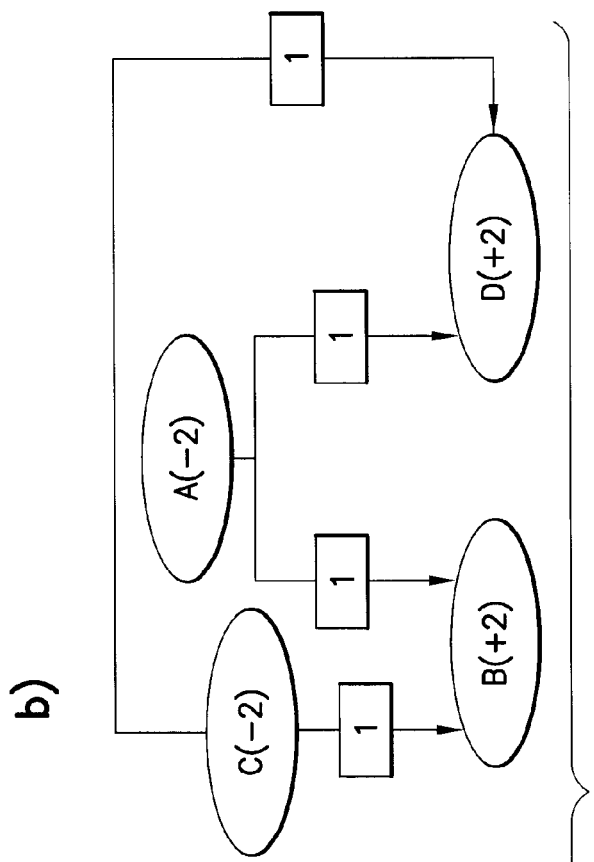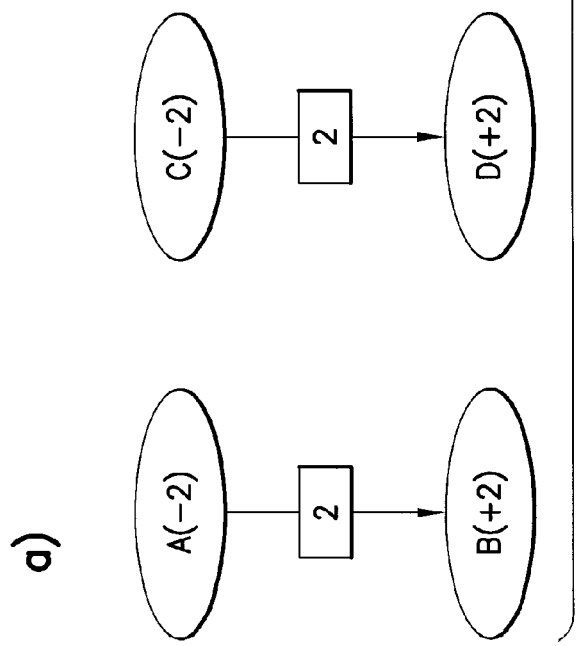
FIG. 19

SYSTEMS, METHODS AND COMPUTER SOFTWARE RELATED TO POOLED CREDIT RISK AND FINANCIAL INSTRUMENT ALLOCATION

RELATED APPLICATIONS

This application claims the benefit of U.S. Provisional Application Ser. No. 60/976,865, filed Oct. 2, 2007, which is incorporated herein by reference in its entirety.

FIELD OF THE INVENTION

One embodiment of the present invention is directed to a system related to pooled credit risk.

Another embodiment of the present invention is directed to a method related to pooled credit risk.

Another embodiment of the present invention is directed to computer software related to pooled credit risk.

Another embodiment of the present invention is directed to a financial instrument allocation optimization algorithm.

In one example, the financial instrument allocation optimization algorithm may relate to a maximum matching algorithm.

In another example, the financial instrument allocation optimization algorithm may relate to a maximum dispersion algorithm.

For the purposes of describing and claiming the present invention the term "credit limit" (such as used, for example, in the context of a credit limit provided by one party to another party) is intended to refer to an amount of financial obligation (s) one counterparty or group of parties is willing to provide another party or group of parties.

Further, for the purposes of describing and claiming the present invention the terms "credit usage" and "credit used" is intended to refer to the utilized portion of a credit limit.

Further, for the purposes of describing and claiming the present invention the term "available credit" is intended to refer to credit limit minus credit usage or credit used. The credit usage or credit used may be actually used and/or requested to be used.

Further, for the purposes of describing and claiming the present invention the term "bilateral agreement" (such as used, for example, in the context of a bilateral agreement between two parties) is intended to refer to an agreement containing the terms and conditions between two, and only two, parties regarding financial instruments (e.g., securities or derivatives). Examples of such a bilateral agreement include, but are not limited to: an ISDA Master Agreement and Credit Support Annex (CSA).

Further, for the purposes of describing and claiming the present invention the term "bilateral credit limit" (such as used, for example, in the context of bilateral credit limit between a pair of parties) is intended to refer to a credit limit between two, and only two, parties.

Further, for the purposes of describing and claiming the present invention the term "settling" (such as used, for example, in the context of a settling a trade) is intended to refer to the execution of a contract or trade relating to a financial instrument or other obligation, such as a derivatives contract.

Further, for the purposes of describing and claiming the present invention the term "position" (such as used, for example, in the context of positions between a plurality of parties) is intended to refer to an open derivative contract or other financial instrument and/or the obligation to enter into such derivative contract or other financial instrument.

Further, for the purposes of describing and claiming the present invention the term "same net positions" (such as used, for example, in the context of the same net positions of parties) is intended to refer to aggregate positions.

Further, for the purposes of describing and claiming the present invention the term "long" (such as used, for example, in the context of a long position) is intended to refer to an open bought position in a financial instrument (e.g., security or derivative).

Further, for the purposes of describing and claiming the present invention the term "short" (such as used, for example, in the context of a short position) is intended to refer to an open sold position in a financial instrument (e.g., a security or derivative).

Further, for the purposes of describing and claiming the present invention the term "vector" is intended to refer to a quantity that has magnitude and direction.

Further, for the purposes of describing and claiming the present invention the term "face" or "facing" (such as used, for example, in the context of the one party facing another party) is intended to refer to one party being in a bilateral agreement with another party (e.g., in connection with a derivative contract).

Further, for the purposes of describing and claiming the present invention the terms "derivative", "derivatives" or "derivative contract" is intended to refer to one or more financial instruments which: (i) is a put, call, cap, floor, collar, or similar option of any kind for the purchase or sale of, or based on the value of, one or more interest or other rates, currencies, commodities, indices, quantitative measures, or other financial or economic interests or property of any kind; (ii) is an interest rate swap, including a rate floor, rate cap, rate collar, cross-currency rate swap, basis swap, currency swap, equity index swap, equity swap, debt index swap, debt swap, credit spread, credit default swap, credit swap, weather swap, commodity swap, or total return swap; (iii) provides for the purchase or sale, on a fixed or contingent basis, of any commodity, currency, instrument, interest, right, service, good, article, or property of any kind; (iv) is otherwise identified by agreement between two parties as a derivative transaction; (v) combination of any of the above where one converts to the other.

Further, for the purposes of describing and claiming the present invention the terms "first derivative type" and "second derivative type" are intended to refer derivatives that differ such that the second derivative type has one or more different contract terms from the first derivative type.

Further, for the purposes of describing and claiming the present invention the term "financial instrument" is intended to refer to a "derivative", "derivatives" or "derivative contract" and/or a security or currency transaction.

Further, for the purposes of describing and claiming the present invention the term "edge" defines positions between parties. In one example "edge" may refer to a vector or series of vectors of different size, type, category, direction and/or weighting between parties.

Further, for the purposes of describing and claiming the present invention the term "parallelization" is intended to refer to executing instructions from one or many computer programs over multiple processors at the same time (e.g., to speed up computation).

Further, for the purposes of describing and claiming the present invention the terms "direct participant", "direct party" or "direct account" are intended to refer a participant or account with direct access to pooled credit.

Further, for the purposes of describing and claiming the present invention the terms "indirect participant", "indirect party" or "indirect account" are intended to refer a participant or account who can only access pooled credit through one or more direct participants.

Further, for the purposes of describing and claiming the present invention the terms "party" and "participant" are intended to be synonymous.

Further, for the purposes of describing and claiming the present invention the term "reallocating" is intended to refer to changing counterparty exposure while maintaining market exposure. In one example, reallocating may comprise an assumption and release.

Further, for the purposes of describing and claiming the present invention the term "value" is intended to refer to a numerical quantity.

BACKGROUND OF THE INVENTION

Various patent documents related to financial systems and/or methods include the following:

U.S. Pat. No. 7,333,950, entitled SYSTEM FOR CREATING, PRICING AND MANAGING ELECTRONIC TRADING AND DISTRIBUTION OF CREDIT RISK TRANSFER PRODUCTS, which was issued Feb. 19, 2008 in the name of Shidler, et al.

U.S. Pat. No. 6,304,858, entitled METHOD, SYSTEM, AND COMPUTER PROGRAM PRODUCT FOR TRADING INTEREST RATE SWAPS, which was issued Oct. 16, 2001 in the name of Mosler et al.

U.S. Pat. No. 5,802,499, entitled METHOD AND SYSTEM FOR PROVIDING CREDIT SUPPORT TO PARTIES ASSOCIATED WITH DERIVATIVE AND OTHER FINANCIAL TRANSACTIONS, which was issued Sep. 1, 1998 in the name of Sampson, et al.

U.S. Patent Publication 2006/0224491, entitled TRADING AND SETTLING ENHANCEMENTS TO THE STANDARD ELECTRONIC FUTURES EXCHANGE MARKET MODEL LEADING TO NOVEL DERIVATIVES INCLUDING ON EXCHANGE ISDA TYPE CREDIT DERIVATIVES AND ENTIRELY NEW RECOVERY PRODUCTS INCLUDING NOVEL OPTIONS ON THESE, which was published Oct. 5, 2006 in the name of Pinkava.

U.S. Patent Publication 2006/0224492, entitled TRADING AND SETTLING ENHANCEMENTS TO THE STANDARD ELECTRONIC FUTURES EXCHANGE MARKET MODEL LEADING TO NOVEL DERIVATIVES INCLUDING ON EXCHANGE ISDA TYPE INTEREST RATE DERIVATIVES AND SECOND GENERATION BOND LIKE FUTURES BASED IN PART OR ENTIRELY ON THEM, which was published Oct. 5, 2006 in the name of Pinkava.

U.S. Patent Publication 2006/0224493, entitled TRADING AND SETTLING ENHANCEMENTS TO THE STANDARD ELECTRONIC FUTURES EXCHANGE MARKET MODEL LEADING TO A NOVEL POOLED AND POTENTIALLY GUARANTEED RISK DEPOSIT MARKET, which was published Oct. 5, 2006 in the name of Pinkava.

U.S. Patent Publication 2006/0224494, entitled TRADING AND SETTLING ENHANCEMENTS TO THE STANDARD ELECTRONIC FUTURES EXCHANGE MARKET MODEL THAT ALLOW BESPOKE NOTIONAL SIZE AND BETTER GLOBAL SERVICE OF END USERS AND MAKE AVAILABLE A NEW CLASS OF NEGOTIABLE SECURITY INCLUDING EQUIVALENTS TO PRODUCTS NORMALLY ISSUED BY SPECIAL PURPOSE VEHICLES, which was published Oct. 5, 2006 in the name of Pinkava.

U.S. Patent Publication 2005/0080734, entitled METHOD, SYSTEM AND COMPUTER PROGRAM PRODUCT FOR TRADING DIVERSIFIED CREDIT RISK DERIVATIVES, which was published Apr. 14, 2005 in the name of Lynch, et al.

U.S. Patent Publication 2004/0143535, entitled SYSTEMS AND METHODS FOR AN ONLINE CREDIT DERIVATIVE TRADING SYSTEM, which was published Jul. 22, 2004 in the name of Hirani, et al.

U.S. Patent Publication 2002/0055897, entitled SYSTEM FOR CREATING, PRICING AND MANAGING AND ELECTRONIC TRADING & DISTRIBUTION OF CREDIT RISK TRANSFER PRODUCTS, which was published May 9, 2002 in the name of Shidler, et al.

BRIEF DESCRIPTION OF THE DRAWINGS

FIGS. 4 and 5 show examples at a point in time related to Settlement: Pre-fixing (Open Positions)—initial positions (FIG. 4 shows a table at a point in time related to such initial positions and FIG. 5 shows a block diagram of interrelated parties at that time) according to an embodiment of the present invention.

FIGS. 6 and 7 show examples of a result according to an embodiment of the present invention at a point in time related to Settlement #1: Fixing—pooled credit is employed (FIG. 6 shows a table at a point in time related to such pooled credit being employed and FIG. 7 shows a block diagram of interrelated parties at that time).

FIGS. 8 and 9 show examples of a result according to an embodiment of the present invention at a point in time related to Settlement #2—when pooled credit is no longer used (FIG. 8 shows a table at a point in time when such pooled credit is no longer used and FIG. 9 shows a block diagram of interrelated parties at that time). In one example, any party can not exceed a credit limit with any other party.

FIGS. 10 and 11 show examples of a result according to an embodiment of the present invention at a point in time related to Settlement #3—hybrid: pooled credit may still be employed by some or all or none of the parties (FIG. 10 shows a table at a point in time related to such hybrid: pooled credit may still be employed by some or all or none of the parties and FIG. 12 shows a block diagram of interrelated parties at that time). In one example, any party can not exceed a credit limit with any other party.

FIGS. 13-19 show example diagrams and tables related to the Application of Combinatorial Optimization, Dynamic Programming and Graph Theory to Pooled Credit (including, for example, Allocation Algorithms and/or or Maximum Matching and/or Dispersion within Pooled Credit).

Figure 1:
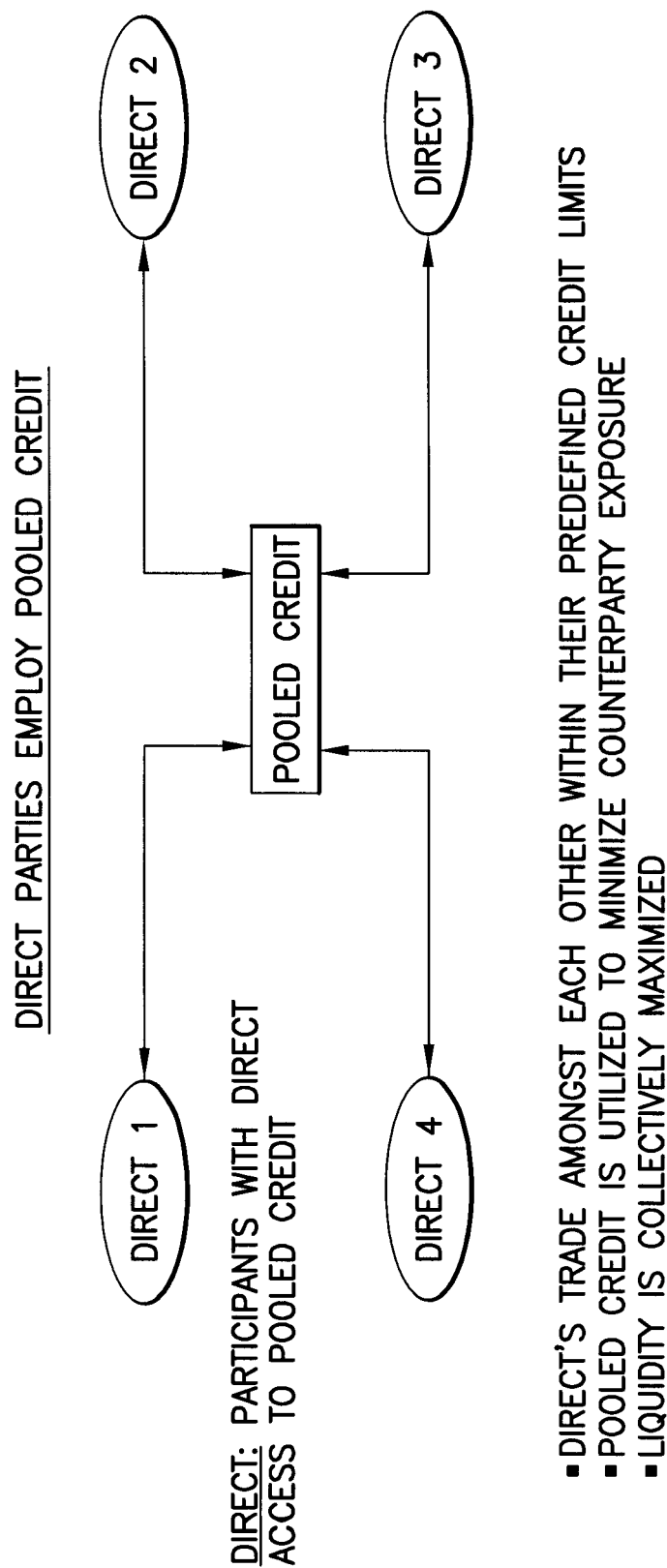
FIG. 1 shows an example block diagram of a pooled credit configuration according to an embodiment of the present invention. In this example, direct participants employ pooled credit; Direct participants are participants with direct access to pooled credit in this example; direct participants trade amongst each other within their predefined credit limits in this example; Pooled credit is utilized to minimize counter-party exposure in this example; Liquidity is collectively maximized in this example).
Figure 2:
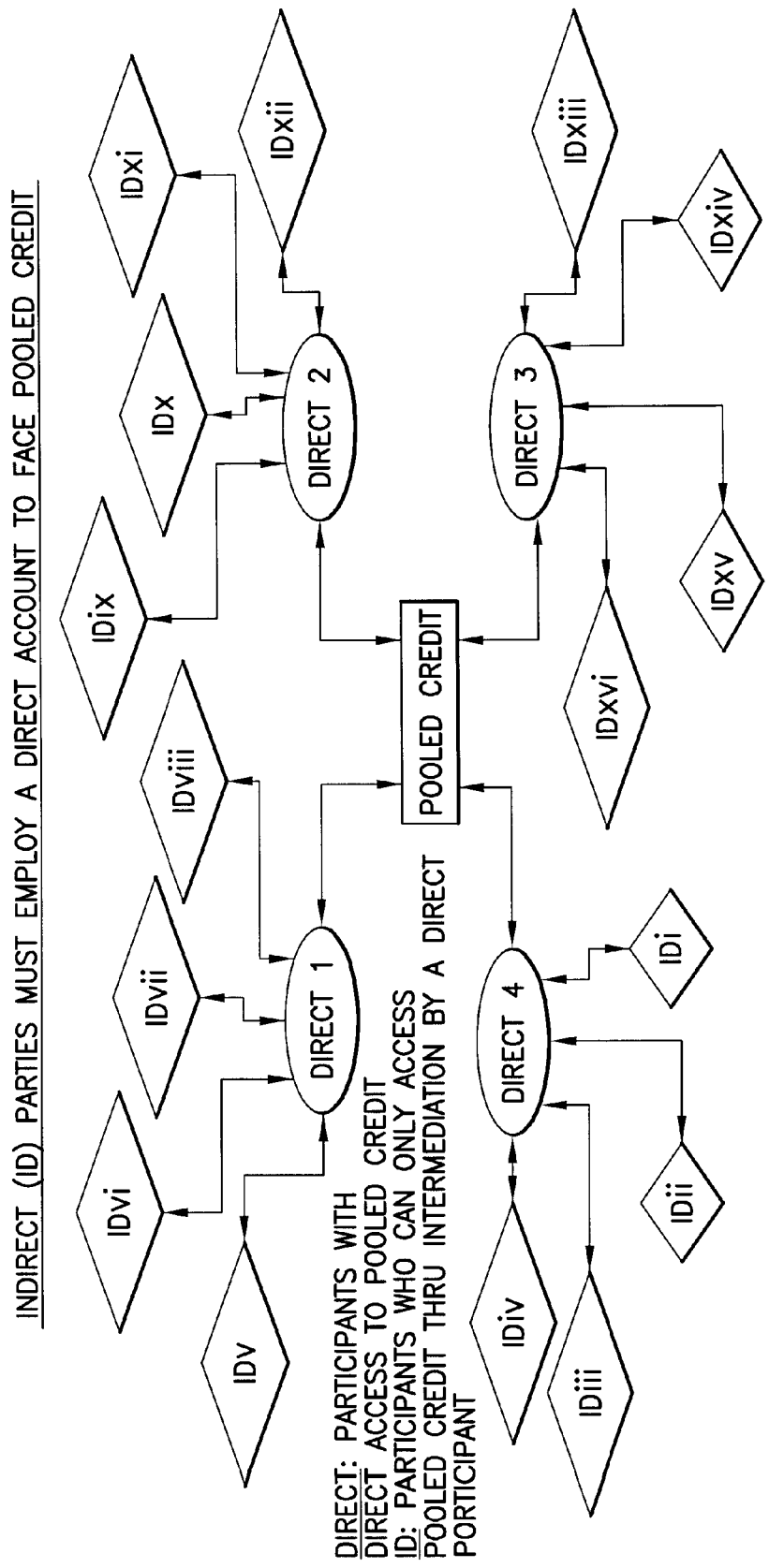
FIG. 2 shows an example block diagram of a pooled credit configuration according to an embodiment of the present invention (In this example, indirect participants ("ID") must employ a direct participant (account) to face pooled credit; Direct participants are participants with direct access to pooled credit and indirect participants are participants who can only access pooled credit through one or more direct participants in this example; A single ID participant can only face a single direct participant due to limit constraints in this example; A single direct participant can face multiple ID participants in this example).
Figure 3:
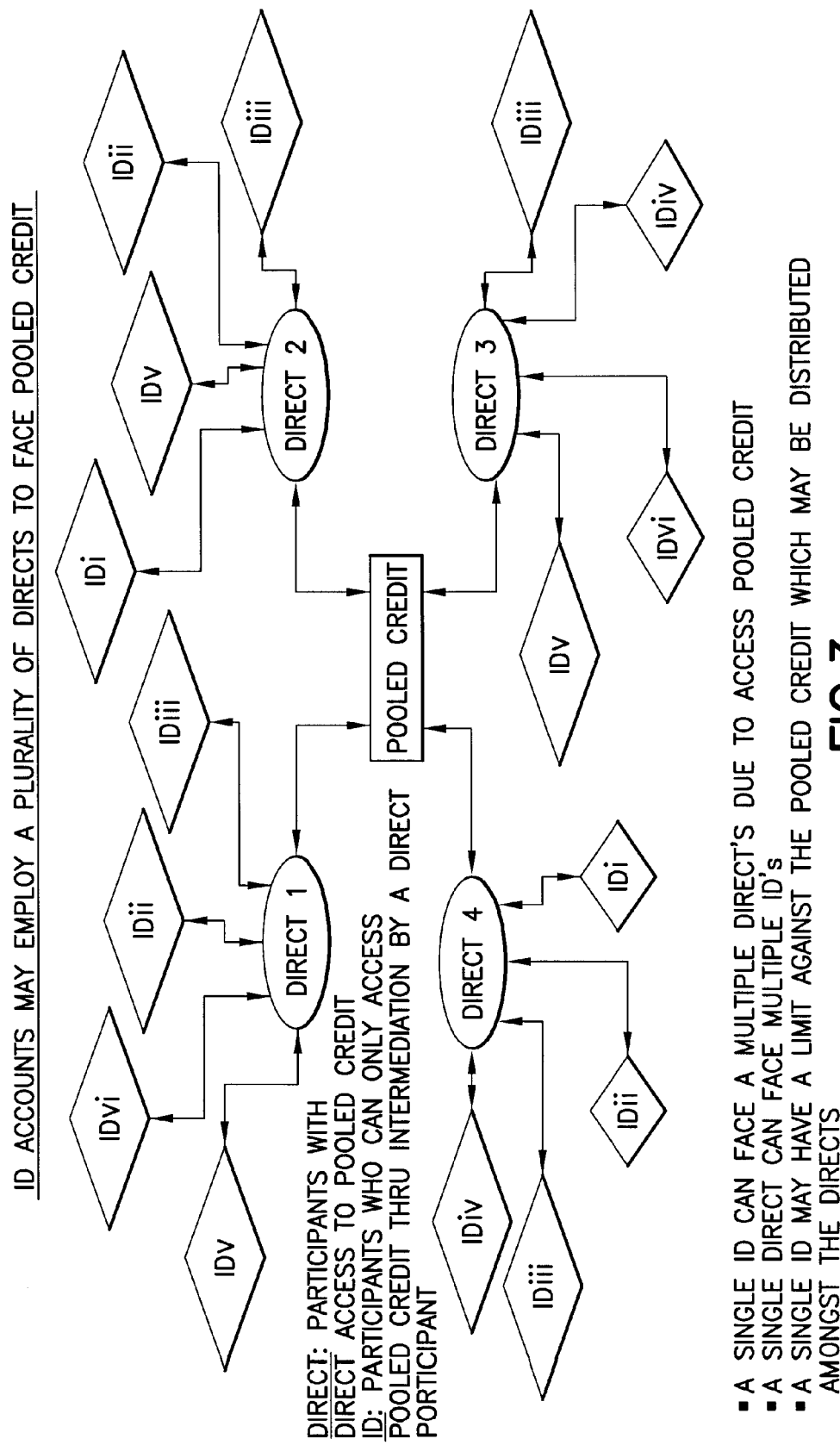
FIG. 3 shows an example block diagram of a pooled credit configuration according to an embodiment of the present invention (In this example, ID participants (accounts) may employ a plurality of direct participants to face pooled credit; Direct participants are participants with direct access to pooled credit and indirect participants are participants who can only access pooled credit through one or more direct participants in this example; A single ID participant can face multiple direct participants due to access to pooled credit in this example; A single direct participant can face multiple ID participants in this example; A single ID participant may have a limit against the pooled credit which may be distributed amongst the Direct participants in this example).
Figure 5:
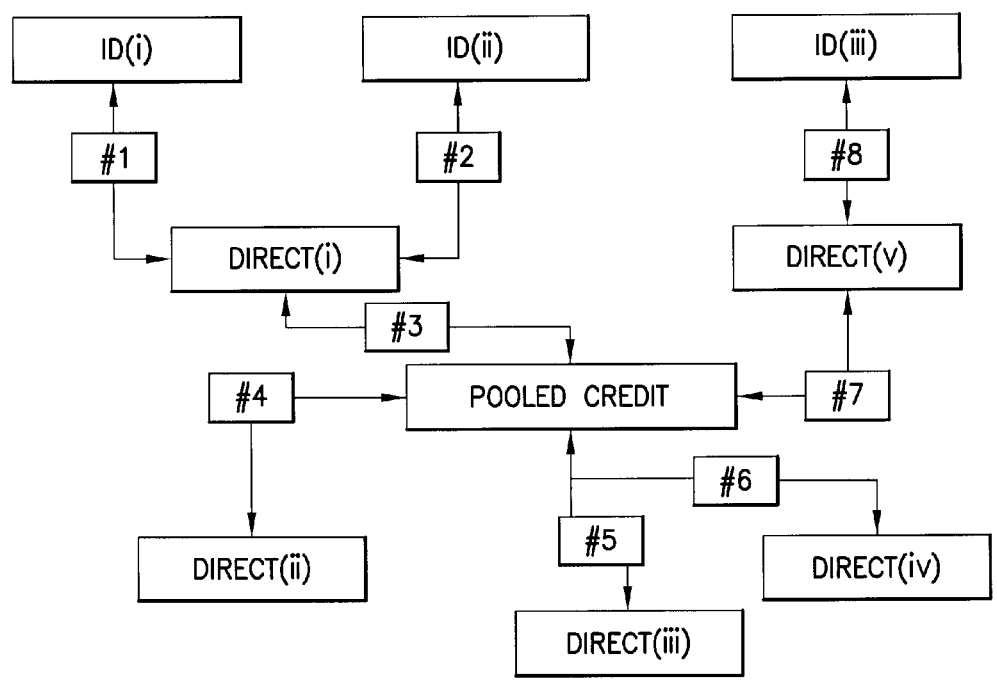
Figure 7:
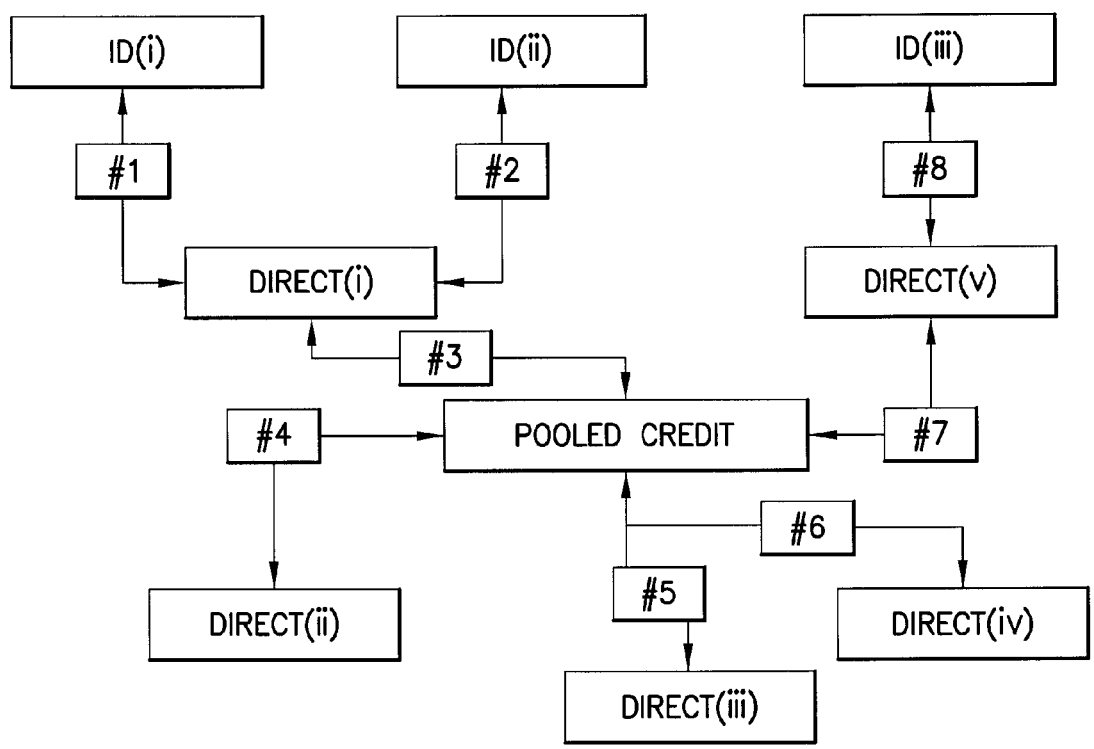
Figure 9:
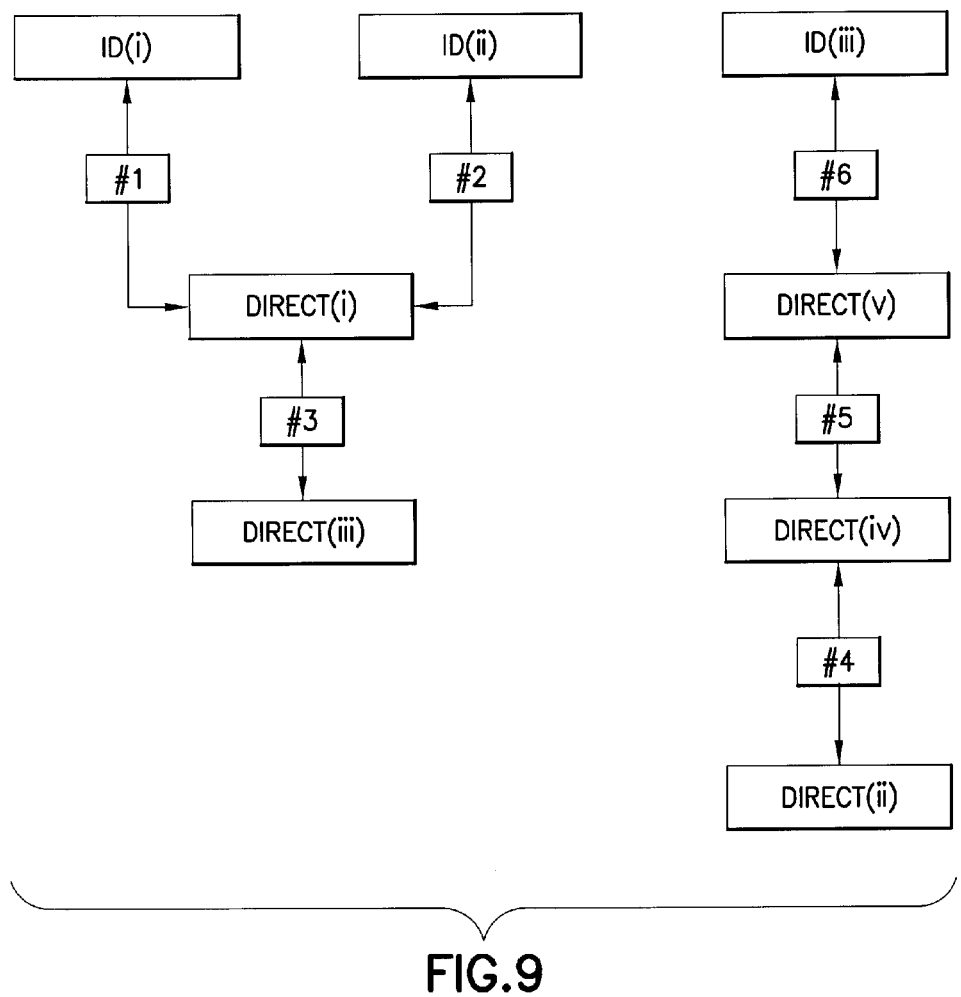
Figure 11:
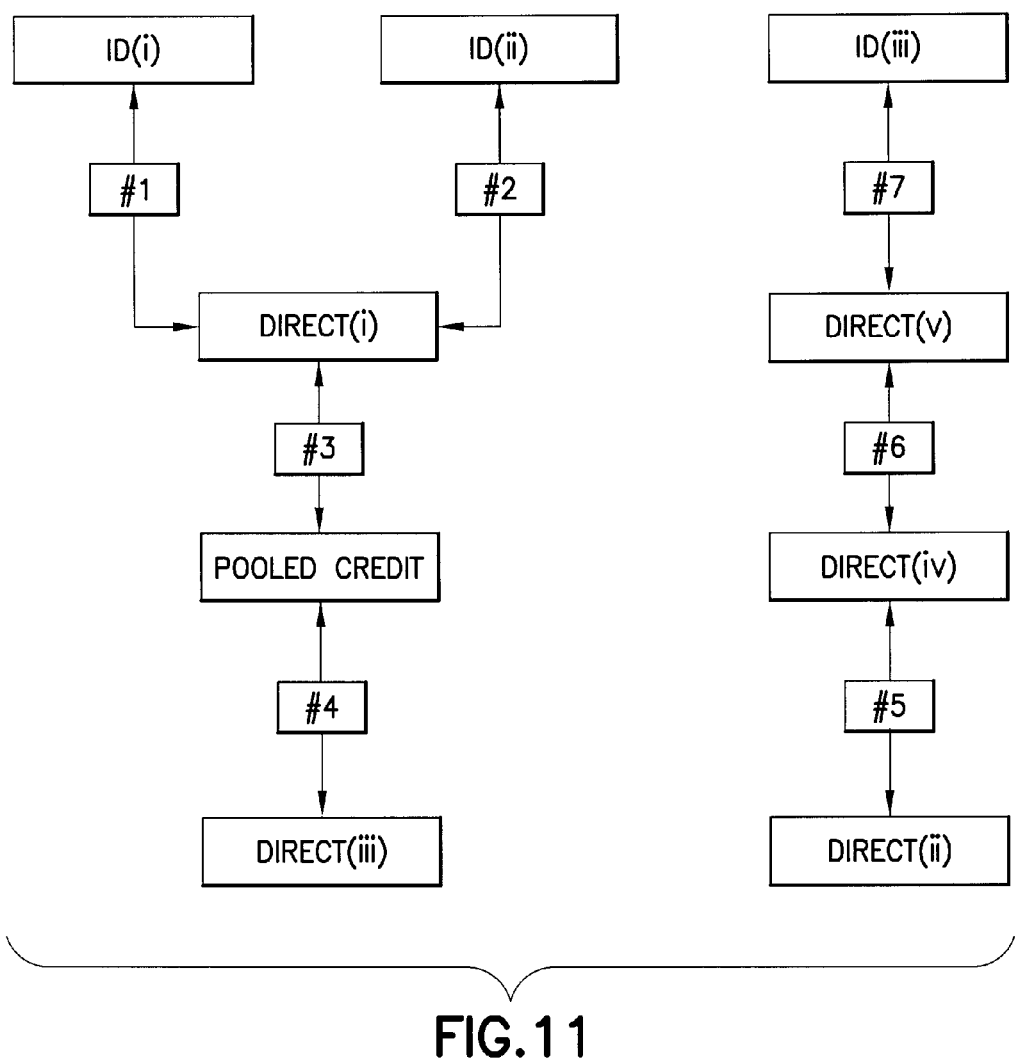
Figure 12:
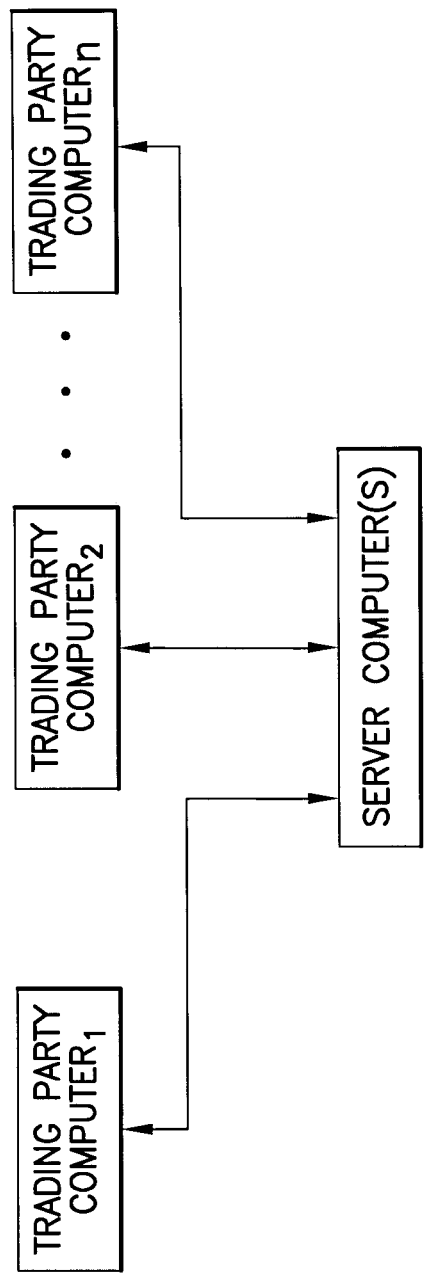
FIG. 12 shows an example block diagram of a computer system according to an embodiment of the present invention (as seen from this diagram, any desired number of trading party computer(s) may communicate (e.g., transfer any desired data) with any desired number of other computer(s) (e.g., server computers)—in one example, the server computer(s) may be operated by the entity operating the pooled credit mechanism—in one example, the communication may be carried out directly between computers, via an intranet, via the Internet and/or by any other desired mechanism).

Of note, any descriptive material provided in the figures is intended to be illustrative (such as in the form of an example) and not restrictive.

Of further note, a Roman or Arabic numeral following a party in the figures is intended to refer to one of a plurality of such parties (e.g., in the case of a "Direct party"—"Direct 1" or "DIRECT (iii)" and in the case of an "Indirect Party"—"ID (iv)").

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components (and any size, material and similar details shown in the figures are, of course, intended to be illustrative and not restrictive). Therefore, specific structural and functional details disclosed herein are not to be interpreted as limiting, but merely as a representative basis for teaching one skilled in the art to variously employ the present invention.

As described herein, various embodiments of the present invention relate to a pooled credit risk warehouse. In one example, credit risk may be pooled (e.g., by an entity, a system, a method, and/or a computer algorithm) amongst all participants (the entity may be subsequently delta neutral—meaning that the entity has no exposure to the change in value or price of contracts offered).

In another example, the entity that is delta neutral is not a party to the transaction(s).

In another example, the participants may have exposure to interest rates and to each other.

In another example, positions amongst participants may be held (e.g., temporarily held) in this pool, whereby the reporting of account balances, risk, and profits and losses are managed (e.g., by the entity, the system, the method, and/or the computer algorithm) so that participants are ultimately assigned their positions vs. other participants within the predefined limits between participants (in other examples, other functions such as administrative and non-administrative may be carried out (e.g., by the entity, the system, the method, and/or the computer algorithm)).

In another example, participants may have two different accounts: Margin and Collateral. These accounts may be employed entering positions (whereby insufficient balances may prevent participants from posting orders or entering trades).

In one specific example, Margin Accounts may be as follows: Represent the cash or cash equivalent securities pledged to the pooled trade matching engine (e.g., computer hardware and/or software platform) that dictates what positions a participant may purchase or sell. A concrete example (which example is, of course, intended to be illustrative and not restrictive) is as follows: If the contractual obligation has a value of −$5,000 (in other words, negative five thousand) and a participant wants to sell 5 of these contracts, that participant has to have $25,000 (in other words, positive twenty five thousand) in their margin account to pay to the entity to ultimately be credited to the participant(s) who purchased these contractual obligations at a negative price. Similarly if a participant wants to purchase contracts that have a positive valuation, they must have sufficient margin to purchase such contractual obligations.

In one specific example, Collateral Accounts may be as follows: Represent the cash or securities pledged to the pooled trade matching engine (e.g., computer hardware and/or software platform) that dictates the total notional amount of the participants' positions. A concrete example (which example is, of course, intended to be illustrative and not restrictive) is as follows: Participant A wants to enter into $10,000,000 USD of contracts, and there is a 10% collateral requirement for that type of contract traded, for that type of participant, the participant must have pledged $1,000,000 USD of cash or securities into the matching engine. In one example, this helps mitigate marking to market moves.

In another example, Accelerated Delivery may be triggered by: (1) In the event that the entity (e.g., the entity operating the pooled trade matching engine) fails to perform its reporting or other duties; (2) the failure of a participant to perform to its contractual obligations; and/or (3) if there is a material change to what the contract's value is based upon (e.g., credit event of a reference obligation, dissolution of a currency, a successor event etc.—typically all outlined in the contract).

In another example, Accelerated Delivery may result in: Participants are delivered their contracts at the contract rate defined by the last time participants' accounts tied out. In one example, this may be the previous business day or a longer period. In this example, by having the contract value dictate the contract rate, accelerated delivery has no economic effect on participants (a true-up).

In another example, the present invention may utilize an investment bank, broker, broker dealer, other financial institution and/or Special Purpose Entity (e.g., a Structured Investment Vehicle) to intermediate these contracts (e.g., for other non-participant entities that wish to enter contracts).

In another example, the present invention may utilize a CTFC, SEC and/or Foreign Equivalent registered clearing house to stand between participants until these participants no longer employ pooled credit in whole or in part for these contractual obligations between participants. In another example, a CTFC, SEC and/or Foreign Equivalent registered clearing house may utilize an investment bank, broker, broker dealer, other financial institution and/or Special Purpose Entity (e.g., Structured Investment Vehicle) to enter into these contracts upon delivery vs. other participants (e.g., for the purpose of clearing).

Reference will now be made to Tables 1 and 2, below. These tables provide an example (which example is intended to be illustrative and not restrictive) of credit extended between parties according to an embodiment of the present invention. Of note, this table provides values at one point in time (e.g., at an initial point in time)—as discussed herein, the values will, of course, change, as credit limits are changed, parties enter and exit the pool, etc. Of further note, credit extended by a counterparty is listed down a column in Table 1 and credit received by a counterparty is listed across the rows of Table 1.

TABLE 1

|  | ID (iii) | DIRECT (v) | DIRECT (iv) | DIRECT (iii) | DIRECT (ii) | DIRECT (i) | ID (ii) | ID (i) |
| --- | --- | --- | --- | --- | --- | --- | --- | --- |
| ID (iii) | — | 50,000 | — | — | — | 75,000 | — | — |
| DIRECT (v) | 50,000 | — | 2,000,000 | 5,000,000 | 10,000,000 | 20,000,000 | 200,000 | 100,000 |
| DIRECT (iv) | — | 1,500,000 | — | 3,000,000 | 2,000,000 | 6,000,000 | — | — |
| DIRECT (iii) | — | 5,000,000 | 3,000,000 | — | 500,000 | 5,000,000 | — | — |
| DIRECT (ii) | — | 10,000,000 | 2,000,000 | 500,000 | — | 1,000,000 | — | — |
| DIRECT (i) | 75,000 | 20,000,000 | 6,000,000 | 5,000,000 | 1,000,000 | — | 350,000 | 200,000 |
| ID (ii) | — | 200,000 | — | — | — | 350,000 | — | — |
| ID (i) | — | 100,000 | — | — | — | 200,000 | — | — |

TABLE 2

| Party | Pooled Credit Afforded to it |
| --- | --- |
| DIRECT (i) | 32,625,000 |
| DIRECT (ii) | 13,500,000 |
| DIRECT (iii) | 13,500,000 |
| DIRECT (iv) | 12,500,000 |
| DIRECT (v) | 36,850,000 |
| ID (i) | 300,000 |
| ID (ii) | 550,000 |
| ID (iii) | 125,000 |

As seen from the above, in this example, in the event that two participants extend differing amounts of credit to each other, the smaller number should control (both parties may be informed of the discrepancy). In this case, DIRECT (v) is only willing to extend 1,500,000 contract units of credit to DIRECT (iv) for this given transaction as opposed to the 2,000,000 contract units of credit DIRECT (iv) is willing to extend to DIRECT (v).

Reference will now be made to an allocation procedure according to an embodiment of the present invention. In one example, in order to facilitate the Allocation Procedure upon Accelerated Settlement, all participants (without regard to whether they maintained a position in an affected Reference Entity) agree to accept assignment (or assumption) and release of Derivatives Position facing any other Participant, in accordance with predefined Counterparty Exposure Limits with the sole provision that their delta remains unchanged through the delivery process (e.g., as predefined and listed below). Allocation: The pooled credit may continue to face counterparties, step out of the trades, or a combination of both, or never having faced each other (see, e.g., the following tables and diagrams of FIGS. 4-12).

In another example, the present invention may provide a mechanism to permit parties the ability to trade in and out of a fungible product and (at the same time) keeping each trade bilateral.

In another example, the present invention may provide a mechanism (e.g., computer hardware and/or software platform) that tracks credit limits (e.g., limits provided and amounts used).

In another example, the present invention may provide a mechanism (e.g., computer hardware and/or software platform) including an algorithm for optimal matching.

In another example, the present invention may provide a mechanism (e.g., computer hardware and/or software platform) that updates dynamically (e.g., in real-time or almost in real-time).

In another example, the present invention may provide a mechanism (e.g., computer hardware and/or software platform) that checks to see if a sufficient amount of cash is available for a particular trade (the checks may be performed, for example, at the order level and/or at the trade level).

In another example, the present invention may provide a mechanism (e.g., computer hardware and/or software platform) that checks to see if a sufficient amount of collateral is available for a particular trade (the checks may be performed, for example, at the order level and/or at the trade level).

In another example, the present invention may provide a mechanism (e.g., computer hardware and/or software platform) that transfers funds (e.g., after a trade).

In another example, collateral may be tied to a particular contract, as opposed to a particular counterparty.

In another example, parties may step in and out of positions relative to pooled credit.

In another example, a delivery date may be the same for all participants to a particular contract.

In another example, one party may pay a counterparty a difference in value related to a contract or position and the contract or position may then be re-struck at a current rate.

In another example, each bilateral agreement may be associated with at least one derivative or more contracts and types.

In another example, each position or other obligation may have a value of x, wherein the value of x is the same for each of the position or other obligations.

In another example, each position or other obligation may have a value of x, wherein the value of x can vary or differ between at least two of the position or other obligations.

In another example, x may be weighted. In one specific example, each x may be weighted the same. In another specific example, at least one x may be weighted differently from at least one other x. In another specific example, x may be weighted based on the underlying financial instrument (e.g., emerging market note may count more towards a limit than a corporate note), and/or the parties involved, and/or other factors.

In another example, a notional size of each position or other obligation may be the same for each position or other obligation.

In another example, a notional size of one position or other obligation may vary or differ from a notional size of at least one other position or other obligation.

In another example, a notional size of each position or other obligation may be weighted. In one specific example, each notional size may be weighted the same. In another specific example, at least one notional size may be weighted differently from at least one other notional size. In another specific example, a notional size may be weighted based on the underlying financial instrument (e.g., emerging market note may count more towards a limit than a corporate note), and/or the parties involved, and/or other factors.

In another example, a mathematical algorithm may re-allocate vectors between nodes to result in an optimal/minimal credit usage amongst participants to maintain the same net position or market exposure.

In another example, a mathematical algorithm may repeat various steps as a result of at least one of the following: parties entering and/or exiting (entering and/or exiting trades; and/or entering and/or exiting participation in a credit pool mechanism); changes in credit limits (e.g., between and/or among parties); and/or upon request for update (including, but not limited to) end of day/period reporting and/or exposure reporting.

In another example, the present invention may provide one or more of the following: pooled credit; bilateral arrangement—first party and second party, with no third party in between; credit limits (e.g., pre-defined credit limits) against individual limits of members of the pool so that each position never exceeds the defined bilateral limits; maintain counter-party credit—through pooled credit and fungible product (e.g., to minimize bilateral risk); maintain the same derivative instrument while maintaining the same counter-party risk limits; eliminate (or reduce) the need for collateral due to the remedy of "accelerated delivery"—deliver the underlying derivative at the option of the performing party.

In another example, the present invention may, in the event that approval of a trade is initially denied, provide a mechanism to run through permutations to free-up credit limits by reallocating usage amongst participants based on their pre-defined limits.

In another example, the present invention may check two credit limits for each position: 1) that an individual credit limit does not exceed the aggregate credit limit of the pool for a particular party; and 2) that the credit between any party does not exceed any of the limits afforded individually by any other party.

In another example, the present invention may provide (such as, for example, by running an algorithm on a computer) for "Maximum Matching"—E.g., utilize combinatorial optimization to reduce credit usage between individual participants in the pooled credit mechanism. This may be accomplished by reducing the number of intermediating nodes (e.g., parties) while adhering to individual credit limits resulting in an optimal/minimal credit usage amongst participants to maintain the same net position or market exposure. This process may allow positions to be reallocated amongst participants providing that it doesn't change participants' market exposure. This reallocation process may be done in a dynamic environment when participants are entering and exiting positions amongst each other.

In another example, the present invention may provide (such as, for example, by running an algorithm on a computer) for "Maximum Dispersion"—E.g., reduce "lumpy" exposures (e.g., credit exposures), that is, diversify exposures (e.g., credit exposures).

In another example, the present invention may provide (such as, for example, by running an algorithm on a computer) for matching participants to maintain the net derivative position for each participant while minimizing the total size of positions between participants with the restriction that the matching results in no pair of participants having long or short positions with each other that exceed a bilateral credit limit between the pair of participants. The present invention may further provide, for example, for re-allocating positions between participants to reflect this result—resulting in an optimal/minimal credit usage amongst participants to maintain the same net position or market exposure. The present invention may further provide, for example, for repeating these steps as a result of at least one of the following: participants entering and exiting (trades and/or a pooled credit mechanism); and/or changes in credit limits; and/or upon request for update including (but not limited to) end of day/period and exposure reporting. In one specific example, this repeating may be done at set time intervals, upon request, and/or at the introduction of every new trade. In another example, the restriction may be based upon and/or reflect previous trading activity between parties.

In another example, the present invention may provide for a combination of types of positions against one credit limit—e.g., a first derivative type and a second derivative type against a single credit limit.

In another example, the present invention may provide for a combination of types of positions against a plurality of credit limits—e.g., a first derivative type against one credit limit and a second derivative type against another credit limit.

In another example, the present invention may provide tiered pooled credit.

In another example, the present invention may be applied to OTC derivatives.

In another example, the present invention may be applied to futures.

In another example, the present invention may operate with more than the minimum number of parties.

In another example, if approval of a requested trade is not initially made, one or more of the following steps may be carried out: reallocating at least part of at least one position between at least one of the one through n parties other than a first one of the one through n parties to the first one of the one through n parties; calculating, with the computer system, an updated value of remaining available credit by subtracting a value of the requested use of credit by the first of the one through n parties from: a previously calculated available credit for the first of the one through n parties plus the reallocated position; approving the requested trade, with the computer system, if the value of the calculated updated remaining available credit associated with the first of the one through n parties is greater than or equal to zero; and settling the requested trade if the requested trade has been approved.

Reference will now be made to various examples related to the Application of Combinatorial Optimization, Dynamic Programming and Graph Theory to Pooled Credit (including, for example, Allocation Algorithms and/or or Maximum Matching and/or Dispersion within Pooled Credit). Of course, this discussion is provided as an example only, and is not intended to be restrictive.

In the section below we explain how a system that consists of Derivatives contracts, a group of parties trading these contracts and certain credit limits placed by the parties on each other can be depicted using constructs from the Graph Theory. Following this, we show how this graph-based representation can be used to make optimizations in such a system.

The credit exposure of parties involved in the Derivatives Trade for a particular contract can be depicted by a Directed Graph G (V, E) where the vertices V represent the parties trading that Derivatives contract and the each edge e∈E represent a credit position.

An edge e (u, v) directed from vertex u to vertex v indicates that party u has shorted a financial instrument (a derivative) to party v (or u has a credit exposure to v).

The weight of edges is given by a function w (e). For edge e (u, v), weight w (e) is the amount of credit exposure that v has to u.

Figure 13:
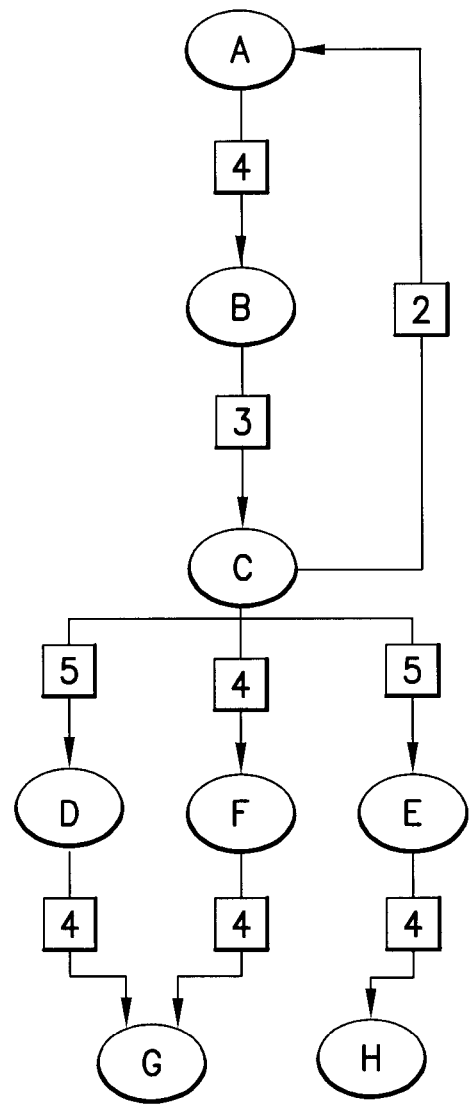

FIG. 13 is an example of such a graph involving 8 parties.

The total outstanding credit in the system is the sum of the weights of all the edges of G (V, E), or T (Total Credit)=$\Sigma_e$ w (e).

Credit Limits

Each party has a limit on the amount of credit exposure that is allowed to them by another party.

Figure 14:
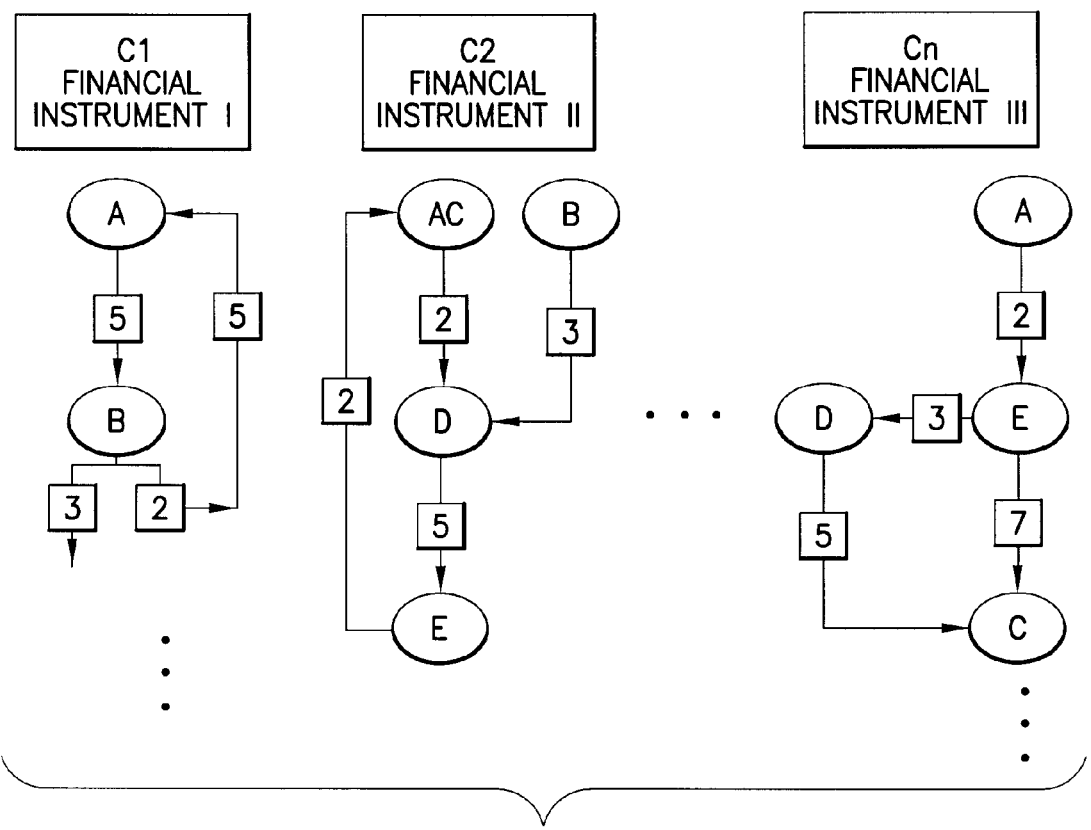

We will call this limit the credit limit. The credit limit extended by party u to v is given by function c (u, v) and can be depicted by a matrix structure as in FIG. 14.

It can be seen from the credit limit matrix in Table 3, below, that the credit extended from party A to B is 10, or c (A, B)=10 and that parties A and C have no limits extended to each other, or c (A, C)=c (C, A)=0.

TABLE 3

Credit Limit Matrix for 4 parties

|      | A  | B  | C  | D  |
|------|----|----|----|----|
| A    | x  | 10 | 0  | 10 |
| B    | 10 | X  | 15 | 10 |
| C    | 0  | 5  | X  | 10 |
| D    | 10 | 10 | 10 | X  |
| ABCD | 20 | 25 | 25 | 30 |

The credit exposure of two parties cannot exceed their extended credit limits. For a single contract this constraint can be written as w (u, v)≤c (u, v).

Multiple Contracts

At any time parties may trade more than one contract on the system. For example, party A may trade a 5 year contract on IBM and a 5 year contract on Ford as well as a 3 year contract on IBM. For each contract $C_1$, $C_2$ through $C_n$, there will be corresponding Graphs $G_1$ ($V_1$, $E_1$), G2 ($V_2$, $E_2$) through $G_n$ ($V_n$, $E_n$). It is critical that there exist a separate graph for each contract to be able to make optimizations.

Hence the system can be completely represented by the set of graphs and the credit limit matrix. Mathematically the system consists of:

A set of parties P

A set of instruments I={I1, I2, . . . , In}

For each instrument in I a corresponding digraph G1 (V1, E1), G2 (V2, E2) through Gn (Vn, En) such that V1, V2, . . . , Vn ⊂ P (the vertices of these graphs are the parties in the system).

For each digraph G (V, E) a Weight Function W, such that W (e) where e (u, v)∈E is the weight of edge 'e (u, v)' which represents the v's credit exposure to u.

A credit limit matrix C such that c (u, v) is the maximum limit extended by party u to v.

The total open interest in the system T=$\Sigma G_i \Sigma_e$w (e) (or the sum of the weight of all edges for all graphs).

The goal of optimization is to obtain,

Maximum Matching in the system leading to the minimum Open Interest

Maximum Dispersion in the system

While satisfying the following constraints:

Constraint 1

Exposure Below Credit Limit

The credit exposure of parties must remain below their extended credit limits, OR ∀<u, v>: u, v∈P, $\Sigma_{i=1,n} W_i(e(u, v)) \leq C$ (u, v)

read as: for each tuple <u, v> such that u, v are elements of the party set P, the sum of the weights of all edges <u, v> across all graphs in G must be less than the credit limit in matrix C for <u, v>.

Figure 15:
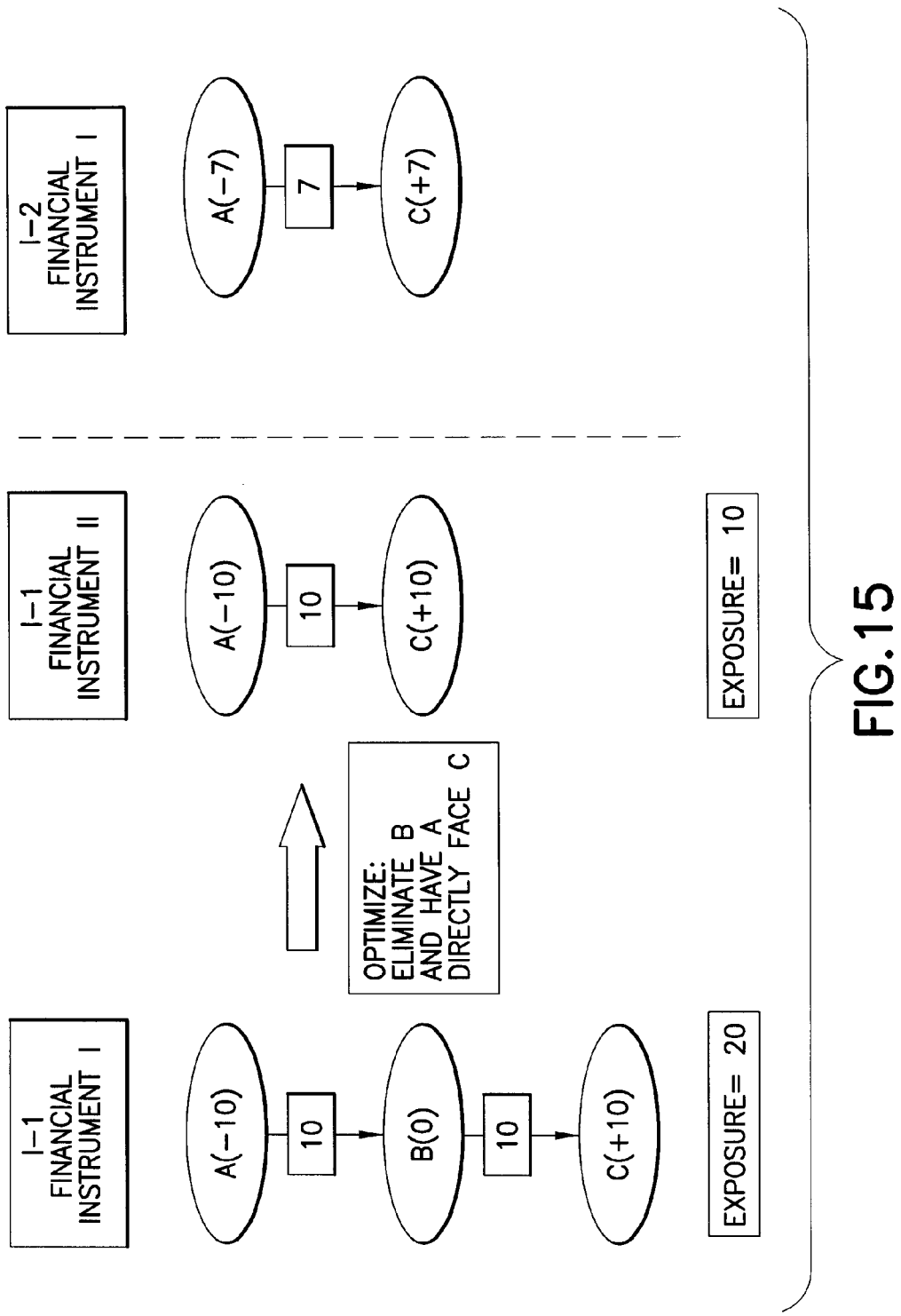

FIG. 15 shows the results of a breach in this constraint. The system in FIG. 15 consists of 2 graphs, one for each of the contracts I1 and I2. The limit matrix shows that each party has afforded a limit of 10 to the other. The total exposure for I1 is the sum of the weights of edges <AB> and <AC> which comes out to be 20. An optimization is made to eliminate B (as it is observed that the net flow for B is 0, +10 incoming from A and −10 outgoing to C). This optimization results in a minimized graph with a single edge <AC>. However, in the graph for instrument I2, the weight of edge <AC> is 7. After the optimization, the total weight for all instances of edges <AC> in the system becomes 10 (from G1)+7 (from G2)=17 which is over the limit of 10 extended from C to A.

This simple example demonstrates the role of the common credit limit across all instruments.

Figure 16:
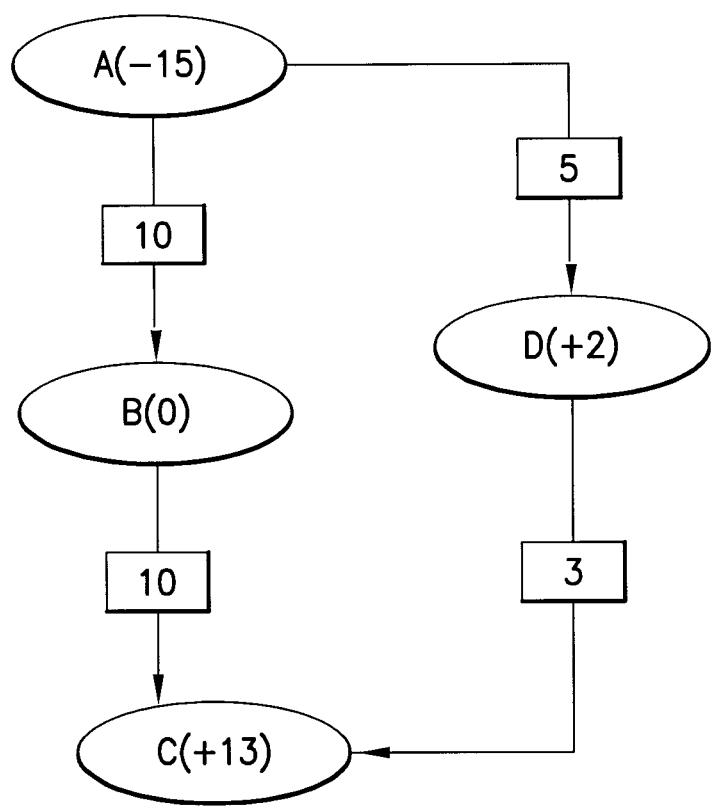

Limit Matrix L for System in FIG. 16

|   | A  | B  | C  |
|---|----|----|----|
| A | x  | 10 | 10 |
| B | 10 | X  | 10 |
| C | 10 | 10 | X  |

Constraint 2

Preservation of Net Position for Each Vertex (Party)

We define "Net Position" of a vertex as the sum of the weights of all edges inbound to that vertex minus the sum of the weights of all edges outbound from that vertex. From FIG. 16, the net position of vertex D is +5 (weight of incoming edge AD)−3 (outgoing edge DC)=+2.

The optimizations made in the system must ensure that the net value of the credit positions of the parties does not change. Hence the net position of every vertex must be preserved.

Approaches to the Solution

Given the goal of minimizing the credit exposure while respecting the given constraints, the problem can be considered as a Path-Minimization problem. As in FIG. 15 to get from (a. to (b. for the graph for Instrument 1, the path <ABC> was minimized to <AC> as vertex B was eliminated. We can define collapsing of edges as a basic operation in such a minimization, as follows:

Collapsing is the process of Transforming a graph G (V, E) with weight function W, by reallocating its edges of into a new Graph G' (V', E') (where V'⊂V) with weight function W', such that ΣW' (E')≤ΣW (E) (that is the sum of weights of the edges of a new graph is less than the sum of weights of the edges of the old graph) AND the net-position of each vertex in V is preserved.

The most basic collapse operation can be performed on 2 adjacent edges thus:

Given two adjacent edges e1 (u, v) and e2 (v, w) of a directed graph G (V, E) such that u, v, w∈V and e1, e2∈E, collapsing can be performed by creating a new edge e3 (u, w) such that w (e3)=min (w(e1), w(e2)) and changing the weights of the e1 and e2 to be w'(e1)=w(e1)−w(e3) and w'(e2)= w(e2)−w(e3) respectively.

Note that as w (e3) is minimum of w(e1) and w(e2), we can have 2 cases after the collapse:
  (i. w(e1)<w(e2): This will result in edge w'(e1)=0 which means e1 can be eliminated from the transformed graph, leaving e2 and e3.
  (ii. w(e1)>w(e2): This will result in edge w'(e2)=0 which means e2 can be eliminated from the transformed graph, leaving e1 and e3.
  (iii. w(e1)=w(e2): This will result in edge w'(e1)=w'(e2)=0 which means e1 as well as e2 can be eliminated from the transformed graph, leaving only e3.

Minimization as a series of Decisions

Using the collapsing approach towards minimization the solution can be considered to be a series of decisions. At any point while optimizing the system, there will be tuples of adjacent edges available from the various graphs in the system to collapse. Hence at any stage of optimization there will be 2 kinds of decisions to be made:
  1. From Which Graph to collapse the tuple of adjacent edges: This is relevant since a choice of collapsing edges from a graph will impact the overall Credit Limit Matrix L and hence affect and possibly constrain the collapsing possibilities in other Graphs in the System.
  2. Given a graph G, which tuple of edges to collapse: This is relevant since any edge incoming (outgoing) on a vertex from (to) which there are multiple edges outgoing (incoming), can participate in a collapse with any of those edges. Collapsing an edge with one against the other may provide a different result and the decision needs to be made carefully to obtain optimal matching. For example a vertex with 2 incoming edges (e1, e2) and 3 outgoing edges (e3, e4, e5) can be a party of 2 times 3=6 collapse configurations (<e1, e3>, <e1, e4>, <e1, e5>, <e2, e3>, <e2, e4>, <e2, e5>) or more generally in m×n collapse configurations where m is the number of incoming edges and n is the number of outgoing edges.

Given that at any time in the system, there may be a number of different graphs, the number of possible decisions becomes the sum of all possible collapse configurations at all possible vertices of each of these graphs.

Such a combinatorial explosion indicates the applicability of combinatorial optimizations in the solution. The first such solution we discuss is that using the principles of Dynamic Programming.

Figure 17:
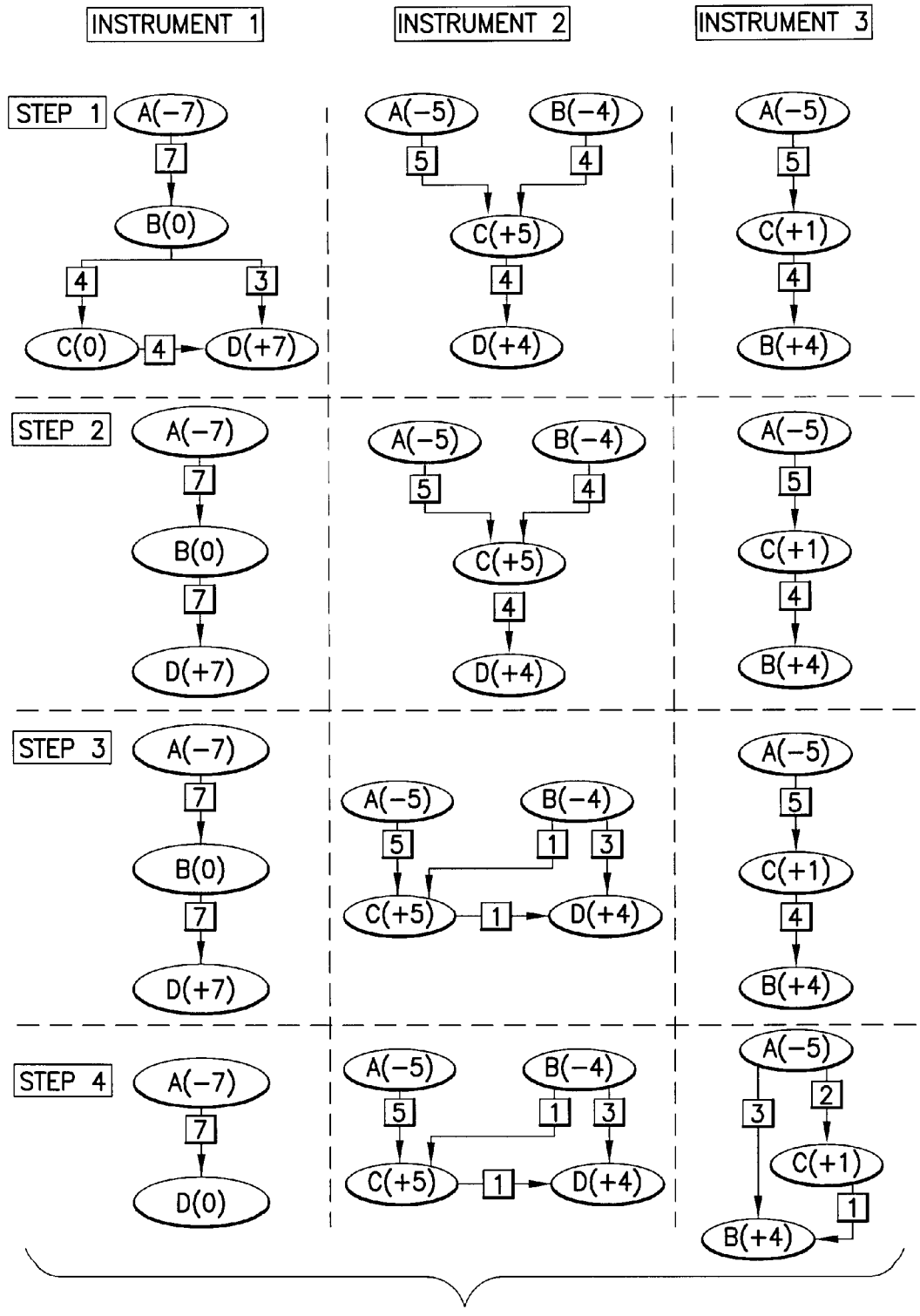

Consider a system of 3 instruments, with 4 parties A, B, C & D that have extended a credit limit of 10 to each other [that is for each edge e in each graph G of the system, c (e)=10] with initial state as in Step 1 of FIG. 17. The sum of the weights of all edges of all graphs for this system is 40.

FIG. 17 shows a step by step minimization via collapsing of this system. In Step 1 the path <BCD> for Instrument-1 is collapsed resulting in the system in Step 2. The graphs for Instruments 2 and 3 are unchanged.

In Step 2, if we choose to collapse a path from Instrument 2, we have 2 choices at vertex C. We could collapse path <ACD> or <BCD>. Note that there are 2 choices available on vertex 2 as the number of incoming edges is 2 and outgoing edges is 1 and 2×1=2. The decision in FIG. 17 is to collapse <BCD> resulting in the system state of Step 3.

In Step 3 we notice that there are no more paths that can be collapsed for Instrument-2. For Instrument-1<ABD> is the only candidate for collapsing, and for Instrument-3<ACB> is the only one. Step 4 shows the system state after collapsing <ABD> and <ACB>.

At this point there are no more paths that can be collapsed in the system. The sum of the weights of all edges of all graphs of the system comes out to be 22, which is less that what we started with (40) and yet the net-position of each vertex in each graph is preserved.

The Dynamic Programming Approach

In this section we present example pseudo code for an algorithm that uses dynamic programming to optimize the system.

1 Procedure Value (gs: Set of Graphs)
2 for i=1 to gs.size ( )
3 subg (i)=split(gs(i))
4 checkFeasibility (subg(i))
5 # recursion base criteria
6 if there are no more subgraphs:
7 return the sum of the weight of the edges of all graphs in gs
8 for i=1 to subg(1).size( )
9 V1i=Value (makeSet (subg (1) (i), gs (2), gs (3), . . . , gs (n)))
10 .
11 .
12 for i=1 to subg(n).size( )
13 Vni=Value (makeSet(subg(n)(i), gs(2), gs(3), . . . , gs(n)))
14 decision=min (V11, V12, V1-subg(1).size( ), . . . , Vn1, Vn2, . . . , Vn-subg(n).size( ))
15 return decision
16 # Procedure to produce all possible graphs on collapsing a graph at a chosen vertex
17 Procedure split(Graph g)
18 Find the next vertex on the graph that has more than one incoming or outgoing edge
19 Let v be this vertex
20 Let subg be the set of all possible graphs that will be the result of a collapse operation on vertex v
21 return subg Listing 1: Dynamic Programming Algorithm to Optimize the System The algorithm presented in Listing 1 will result in a decision tree via recursion. The base criteria of the recursion occurs when no more collapsing can be done on any of the graphs. The procedure Value calls itself recursively to generate a decision tree. The depth of the decision tree will depend on how soon the minimum graphs (that cannot be collapsed further) are obtained. The breadth of the decision tree depends on how many subgraphs are obtained from the split operation, on each level.

The procedure checkFeasibility on Line 4 will check each generated subgraph for its feasibility. If a subgraph has characteristics that prove it to be sub-optimal or infeasible, it will be eliminated from further consideration (hence decreasing the breadth of the recursion).

The Net-Position Matching Approach

In addition to the collapsing approach to optimization we present an approach that calculates the Net Position of each party (or vertex) in each graph to start with, and creates corresponding new graphs from scratch with parties/vertices having the same net positions as in the previous graphs.

This approach indicates the problem to be one of maximum matching or distribution of net positions so as to obtain a minimum of open interest (or sum of the weights of the edges of each graph) in the overall system.

It is possible to apply dynamic programming to solve the above problem as well. Consider the 2-Instrument system of FIG. 18.

Figure 18:
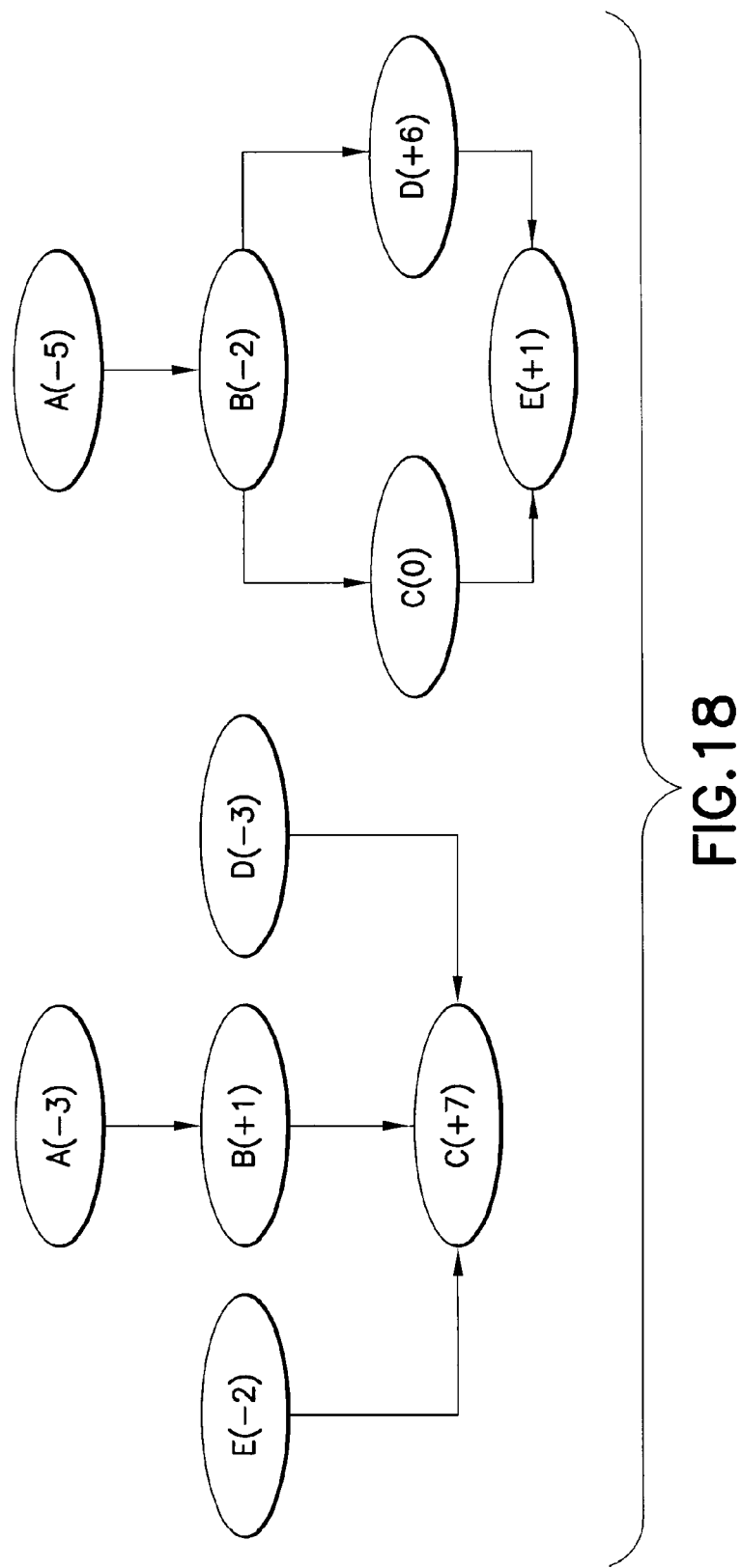

We can write down the net positions of the system in FIG. 18 above as such:

| | Instrument-1 | | Instrument-2 |
|---|---|---|---|
| A | −3 | A | −5 |
| B | +1 | B | −2 |
| C | +7 | C | 0 |
| D | −3 | D | +6 |
| E | −2 | E | +1 |

At any step there is a choice of allocating 1to n units (depending on the credit limit matrix) from A, D, E in Instrument-1 to B or C in Instrument-1.

Similarly, there is also a choice of allocating 1 to n units from A, B, C in Instrument-2 to D, E in Instrument-2.

An algorithm similar to that in Listing 1 can be applied to such a decision based approach as well. It may be noted that this problem is reminiscent of the classic Knapsack Problem, albeit with additional constraints and modifications.

Achieving Maximum Dispersion

It is possible to have 2 systems with parties having the same net positions but different credit exposures to each other. We present an example in FIG. 19.

The 2 systems in the above figure are equivalent in terms of their net positions but system configuration (b. allows a wider distribution of credit exposure among parties. In other words, in configuration (a. party B has an exposure of 2 versus party A while in configuration (b. party B has an exposure of 1 versus C and 1 versus A, hence maintaining a net position of +2 but having the credit exposure distributed over parties hence reducing credit risk.

Once we have obtained a system that optimizes open interest by reducing it to a minimum, we will next redistribute the credit risk among parties while maintaining the open interest as well as the Net Positions.

Parallelization

Parallelization may be used to evaluate the different paths that are generated by the dynamic programming algorithms in order to speed-up the computation.

For the purposes of this disclosure, a computer readable medium is a medium that stores computer data in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may be "computer implementable" or "computer implemented." In this regard, it is noted that while such methods can be implemented using a computer, the methods do not necessarily have to be implemented using a computer. Also, to the extent that such methods are implemented using a computer, not every step must necessarily be implemented using a computer. Further, any steps described herein may be carried out in any desired order (and any steps may be added and/or deleted).

What is claimed is:

1. A computer implemented method relating to one through n parties, comprising:

receiving, via a computer system, data regarding a credit limit provided by each of the one through n parties to each of the other one through n parties, wherein n is a minimum number of parties, wherein n=4, and wherein each credit limit is associated with a bilateral agreement between respective parties;

aggregating, with the computer system, the credit limit provided to each of the one through n parties by each of the other of the one through n parties to generate an initial aggregate credit limit for each party, wherein the initial aggregate credit limit for each party is a sum of the credit limits provided to each party by at least two other of the one through n parties;

receiving, via the computer system, first data regarding requested use of credit by a first of the one through n parties and second data identifying total positions between the one through n parties, wherein the requested use of credit by the first of the one through n parties is associated with a first requested trade, wherein the first requested trade is a long or a short trade of a first derivative between the first of the one through n parties and another party of the one through n parties;

calculating, with the computer system, a value of remaining available credit by subtracting a value of the requested use of credit by the first of the one through n parties from the initial aggregate credit limit for the first of the one through n parties;

calculating, with the computer system, a first net derivative position for the first of the one through n parties to the at least two other of the one through n parties, wherein the first net derivative position for the first of the one through n parties is a total size of long positions for the first of the one through n parties minus an absolute value of a total size of short positions for the first of the one through n parties;

approving the first requested trade, with the computer system, based, at least in part on:
  i) the value of the calculated remaining available credit associated with the first of the one through n parties is greater than or equal to zero and
  ii) a first allocation wherein the first allocation is an allocation of derivative positions of the one through n parties, after the first requested trade goes through, that maintains or minimizes the first net derivative position for the first of the one through n parties;

settling the approved first requested trade: and reallocating, with the computer system, the derivatives positions based on the first allocation.

2. The computer implemented method of claim 1, further comprising:
- receiving, via the computer system, third data regarding requested use of credit by a second of the one through n parties, wherein the requested use of credit by the second of the one through n parties is associated with a second requested trade, wherein the second requested trade is a long or a short trade of a second derivative between the second of the one through n parties and another party of the one through n parties;
- calculating, with the computer system, a value of remaining available credit by subtracting a value of the requested use of credit by the second of the one through n parties from the initial aggregate credit limit for the second of the one through n parties;
- calculating, with the computer system, a second net derivative position for the second of the one through n parties to the at least two other of the one through n parties, wherein the second net derivative position for the first of the one through n parties is a total size of long positions for the second of the one through n parties minus an absolute value of a total size of short positions for the second of the one through n parties;
- approving the second requested trade, with the computer system, based, at least in part on:
  - i) the value of the calculated remaining available credit associated with the second of the one through n parties is greater than or equal to zero and
  - ii) a second allocation wherein the second allocation is an allocation of the derivative positions of the one through n parties, after the second requested trade goes through, that maintains or minimizes the second net derivative position for the second of the one through n parties;
- settling the approved second requested trade; and
- reallocating, with the computer system, the derivative positions based on the second allocation.

3. The method of claim 1, wherein the computer system comprises a plurality of computers.

4. The method of claim 3, wherein at least one of the steps is carried out in association with a first one of the plurality of computers and at least another one of steps is carried out in association with a second one of the plurality of computers, wherein the first and second computers are distinct from one another.

5. The method of claim 4, wherein the first and second computers are in operative communication with one another.

6. The method of claim 1, wherein the credit limit provided by at least one of the one through n parties differs from the credit limit provided by at least one other one of the one through n parties.

7. The method of claim 1, wherein the first derivative and the second derivative are based on the same stock.

8. The method of claim 1, wherein the steps are carried out in the order recited.

9. The method of claim 1, wherein the first derivative and the second derivative are based on different stocks.

10. The method of claim 1, wherein at least one credit limit is associated with a plurality of derivatives.

* * * * *